(12) United States Patent
Furuta et al.

(10) Patent No.: US 7,021,673 B2
(45) Date of Patent: Apr. 4, 2006

(54) HOSE WITH CORRUGATED METAL TUBE

(75) Inventors: Norihiko Furuta, Aichi-ken (JP); Yuji Takagi, Aichi-ken (JP); Tomohide Ito, Aichi-ken (JP)

(73) Assignee: Tokai Rubber Industries, Ltd. (JP)

( * ) Notice: Subject to any disclaimer, the term of this patent is extended or adjusted under 35 U.S.C. 154(b) by 154 days.

(21) Appl. No.: 10/698,239

(22) Filed: Oct. 31, 2003

(65) Prior Publication Data

US 2004/0090065 A1 May 13, 2004

(30) Foreign Application Priority Data

Oct. 31, 2002  (JP) ........................ 2002-319153

(51) Int. Cl.
*F16L 33/00* (2006.01)

(52) U.S. Cl. .................. 285/242; 285/242; 285/256; 285/222.1; 285/382; 285/903; 29/508; 29/516

(58) Field of Classification Search ............... 285/242, 285/255, 256, 259, 903, 222.1, 222.2, 114, 285/115, 382; 29/508, 516
See application file for complete search history.

(56) References Cited

U.S. PATENT DOCUMENTS

| | | | | |
|---|---|---|---|---|
| 2,309,719 A | * | 1/1943 | Vaill | 285/222.5 |
| 2,848,254 A | * | 8/1958 | Millar | 285/222.5 |
| 3,549,180 A | * | 12/1970 | MacWilliam | 285/256 |
| 5,297,337 A | * | 3/1994 | Igarashi et al. | 29/890.144 |
| 5,356,182 A | * | 10/1994 | Sanders | 285/258 |
| 5,404,632 A | * | 4/1995 | Zaborszki | 29/508 |
| 5,413,147 A | * | 5/1995 | Moreiras et al. | 138/109 |
| 6,016,842 A | * | 1/2000 | Rooke | 138/109 |
| 6,604,758 B1 | * | 8/2003 | Assenheimer | 285/115 |
| 2002/0007860 A1 | * | 1/2002 | Katayama et al. | 138/139 |
| 2004/0094953 A1 | * | 5/2004 | Luft et al. | 285/256 |

* cited by examiner

*Primary Examiner*—James M. Hewitt
(74) *Attorney, Agent, or Firm*—Andrus, Sceales, Starke & Sawall, LLP (57) ABSTRACT

A hose having a corrugated metal tube as the innermost layer and an outer layer including an inner elastic layer, a reinforced layer and an outer elastic layer. A socket fitting is swaged onto the hose body at three axially spaced points. The corrugated metal tube is provided with a flattened end portion. A proximal end of the flattened end portion extends for a minimum of 10 mm. axially away (in the direction of the complete corrugations) from the swaged point which is axially most proximate to the proximal end of the flattened end portion.

2 Claims, 8 Drawing Sheets

HOSE WITH CORRUGATED METAL TUBE

BACKGROUND OF THE INVENTION

The present invention relates to a hose with corrugated metal tube which is suitable for fuel conveying hose for automobiles, refrigerant conveying hose or any other fluid conveying hose, and more particularly to a hose with corrugated metal tube including characteristic structure of an axial end portion thereof.

Typical rubber hoses, for example, made of blended product of acrylonitrile-butadiene rubber and polyvinyl chloride (NBR/PVC blend) which is excellent in resistance to gasoline permeability, have been used for conveying fuel for automobiles or the like in view of their high vibration-absorbability, easy assembling or the like. However, for the purpose of global environment protection, the regulations have been recently tighten against permeation of fuel for automobiles or the like, and are anticipated to be further tighten in the future. Further, hoses are demanded to meet the requirements to convey highly permeable fluid such as, hydrogen gas used in fuel cells or carbon dioxide ($CO_2$) refrigerant. Then it is anticipated difficult to satisfy the future requirements with hoses made only of organic materials such as rubber or resin.

Accordingly, it is currently considered to adapt a hose having a corrugated metal tube for inner layer as future hose of low fluid permeability because such a hose is expected to have an extremely high fluid impermeability.

As for a hose with corrugated metal tube, such hoses as disclosed in the-following patent documents, 1, 2 and 3 are known.

In case of these hoses with corrugated metal tube, even if adapted for hydrogen gas used for fuel cells, a corrugated metal tube in or as an inner layer reduces gas permeation to zero, i.e., completely eliminates permeation of gas.

1. JP, A, 2001-182872
2. US20020007860A1
3. JP, U, 51-150511

Figure 5:
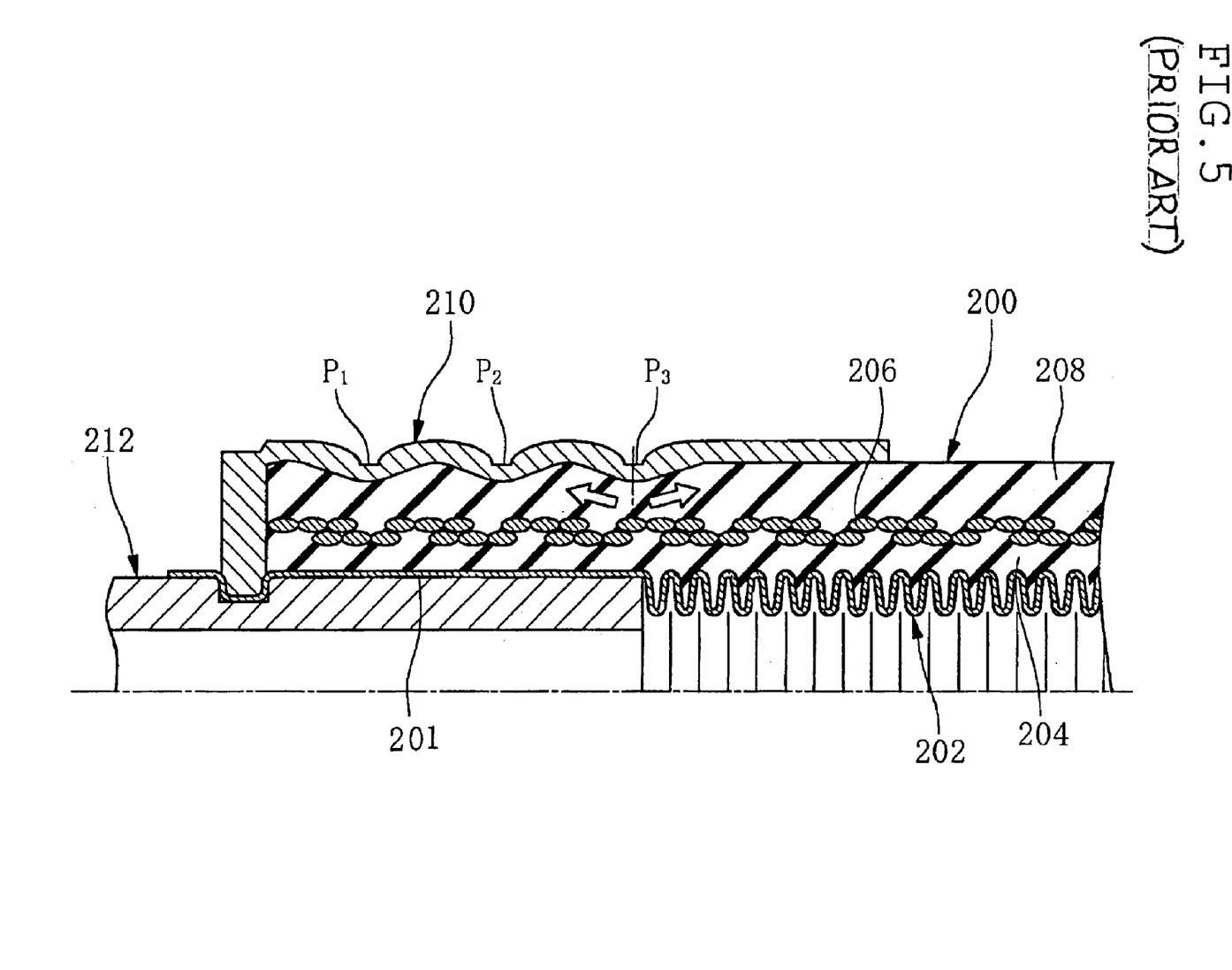
FIG. 5 is a cross-sectional view of a relevant portion of a hose with corrugated metal tube of the prior art to be contrasted with the present invention.

And, FIG. 5 shows a hose with corrugated metal tube of this type which is invented by the inventors of the present invention and helpful for better understanding of the present invention. In FIG. 5, a numeral reference 200 indicates a hose body. The hose body 200 is formed multi-layered. The multi-layered construction has inner layer including a corrugated metal tube 202 of innermost layer and outer layer which circumscribe a radial outer side of the inner layer and includes inner elastic layer 204, reinforced layer 206 and outer elastic layer 208.

A numeral reference 210 indicates a socket fitting fitted on an outer periphery of the hose body 200 on an axial or longitudinal end portion, or on one axial or longitudinal end portion of the hose body 200. The socket fitting 210 is compressed or swaged radially inwardly at three axially spaced points $P_1$, $P_2$ and $P_3$ thereof or on a cylindrical portion of the socket fitting 210. And thereby the socket fitting 210 and a connecting pipe 212 are fixedly secured to one axial or longitudinal end portion of the hose body 200 so as to clamp one axial or longitudinal end portion of the hose body 200 therebetween from inner and outer sides thereof.

Figure 6:
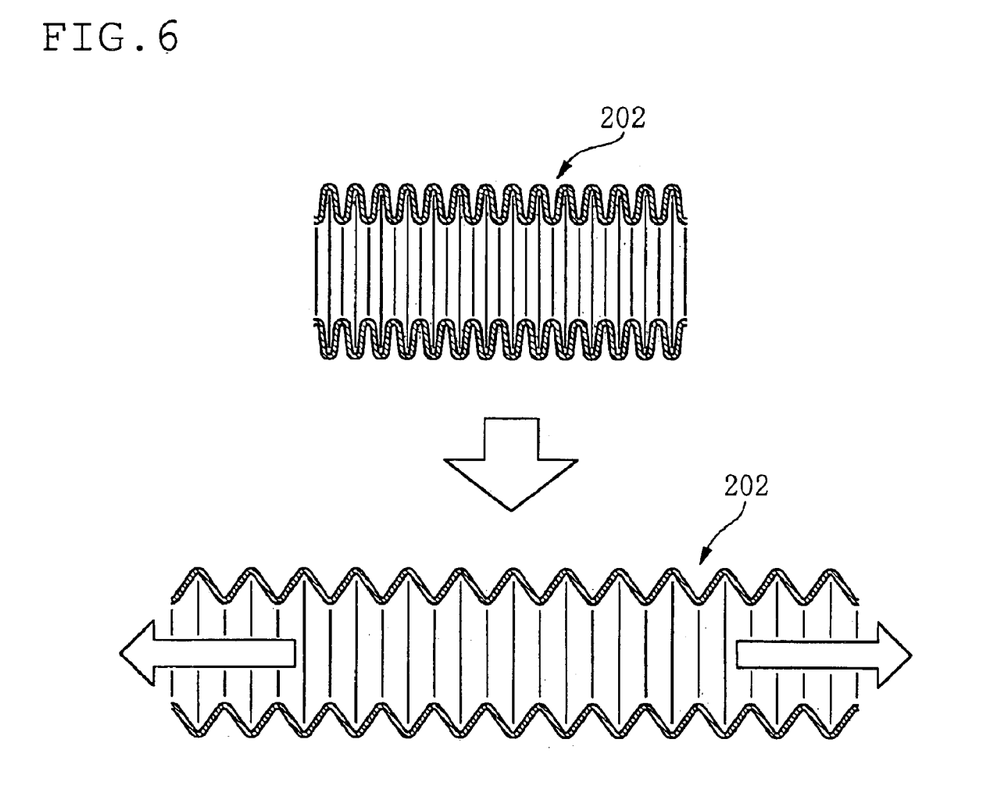
FIG. 6 is an explanatory view showing deformation of a corrugated metal tube.

Meanwhile, as shown in FIG. 6, in such hose with corrugated metal tube, the corrugated metal tube 202 tends to expand or elongate in an axial or longitudinal direction when an internal pressure is exerted thereto. Therefore, such hose with corrugated metal tube inherently involves a fear that when an internal pressure is exerted thereto repeatedly at pulse intervals, the corrugated metal tube 202 overall repeatedly oscillatingly elongates or expands and contracts in a longitudinal direction, and consequently repeated longitudinal deformation thereof causes a fatigue crack or crack in the corrugated metal tube 202 in any portions thereof. More specifically, it is predicted that the corrugated metal tube 202 is strongly restrained from moving on the last swaged point $P_3$, a stress is likely concentrated in a position corresponding to the last swaged point $P_3$, and consequently the corrugated metal tube 202 is likely subject to fatigue crack or break at the last swaged point $P_3$.

However the inventors of the present invention actually conducted a impulse test or repeated pressurizing test to exert internal pressure repeatedly to this hose with corrugated metal tube and found the fact that the corrugated metal tube 202 is cracked or broken generally at a certain distance axially away from the last swaged point $P_3$ of the socket fitting 210. More specifically, the inventors found the fact that the corrugated metal tube 202 is broken about at 7.0 mm axially away from the last swaged point $P_3$.

The reason is estimated that a portion of the hose body 200 inside of the socket fitting 210 is strongly compressed radially inwardly at the last swaged point $P_3$ when compressing or swaging the socket fitting 210 radially inwardly, and the compressed portion of the hose body 200 is partly extruded or squeezed out rearwardly (toward the right hand in FIG. 5) as shown by a right-hand arrow in FIG. 5.

The above are described with reference to a hose for conveying hydrogen gas used in a fuel cell as example. The similar problems are anticipated in common to any hoses. For example, it may be the case that a hose with corrugated metal tube is employed to convey fuel such as gasoline for the purpose to deal with gasoline or the like permeating to an air or for high temperature and high pressure application due to high output power of equipment, where low permeability property is severely regulated. Also, it may be the case that a hose with corrugated metal tube is employed to covey carbon dioxide ($CO_2$) as refrigerant fluid, which is low in amount of particles just like hydrogen and is highly permeable. Further, it may be any other case that a hose with corrugated metal tube is applied in fields under severe regulations against gas permeation.

It is an object of the present invention to provide a hose with corrugated metal tube to settle the problems described above.

SUMMARY OF THE INVENTION

According to the present invention, there is provided a novel hose with corrugated metal tube comprising a hose body having inner layer including a corrugated metal tube and outer layer including reinforced (reinforcing) layer, and a socket fitting fitted on the hose body at one longitudinal or axial end portion thereof and compressed or swaged radially inwardly to be secured thereto. The outer layer circumscribes a radial outer side of the inner layer. The corrugated metal tube is provided with a flattened end portion which may comprise a straight tubular or straight-walled portion extending straight in a longitudinal direction on one axial end portion of the corrugated metal tube. The flattened end portion of the corrugated metal tube also may be provided with a pre-formed flat and incomplete corrugated portion, for example, extending in a longitudinal direction thereon. The flattened end portion of the corrugated metal tube further may be provided with a straight tubular portion and a pre-formed flat and incomplete corrugated portion thereon. A proximal end of said flattened end portion, where the flattened end portion joins the end of the corrugated metal tube comprising complete corrugations, extends axially away in the direction of said complete corrugations from a swaged point on the socket fitting that is axially most proximate to said proximal end. And, the axial distance between the proximal end of said flattened end portion and the most proximate swaged point of the socket fitting is a minimum of 10 mm. That is, the proximal end of the flattened end portion extends for minimum of 10 mm axially away from the last swaged point (the swaged point most proximate to the proximal end) in the direction of the complete corrugations. Here, a term "longitudinal" or "axial" is used with respect to a length or an axis of the hose body, the socket fitting or a relevant member.

A compressing or swaging rate of the last swaged point for the socket fitting may be minimum 20%.

As already described, when a hose with corrugated metal tube is repeatedly subject to internal pressure, a corrugated metal tube is cracked or broken not at the last swaged point of a socket fitting, but generally at a certain distance axially away from the last swaged point thereof. The reason for this has not been confirmed clearly at present, but is estimated as follows.

In the hose with corrugated metal tube shown in FIG. 5, as already explained, a portion of the hose body 200 inside of the socket fitting 210, specifically a portion thereof axially corresponding to the last swaged point $P_3$ is strongly compressed radially inwardly and is partly extruded or squeezed out rearwardly (toward the right hand in FIG. 5) when the socket fitting 210 is compressed or swaged radially inwardly.

At that time, the reinforced (reinforcing) layer 206 is loosen or relaxed at a portion behind the last swaged point $P_3$, i.e. a portion in a side of the extruded or squeezed-out part of the outer layer of the hose body 200. In other words, if the reinforced layer 206 is initially braided or winded (herein after explained as "braided") with reinforcing filament member or members at a neutral angle of about 55 degrees (55°), braid angle (angle of braiding) of the portion on the side of the extruded or squeezed-out part of the outer layer by the swaged socket fitting 210 is changed to be higher than the initial braid angle.

Figure 7:
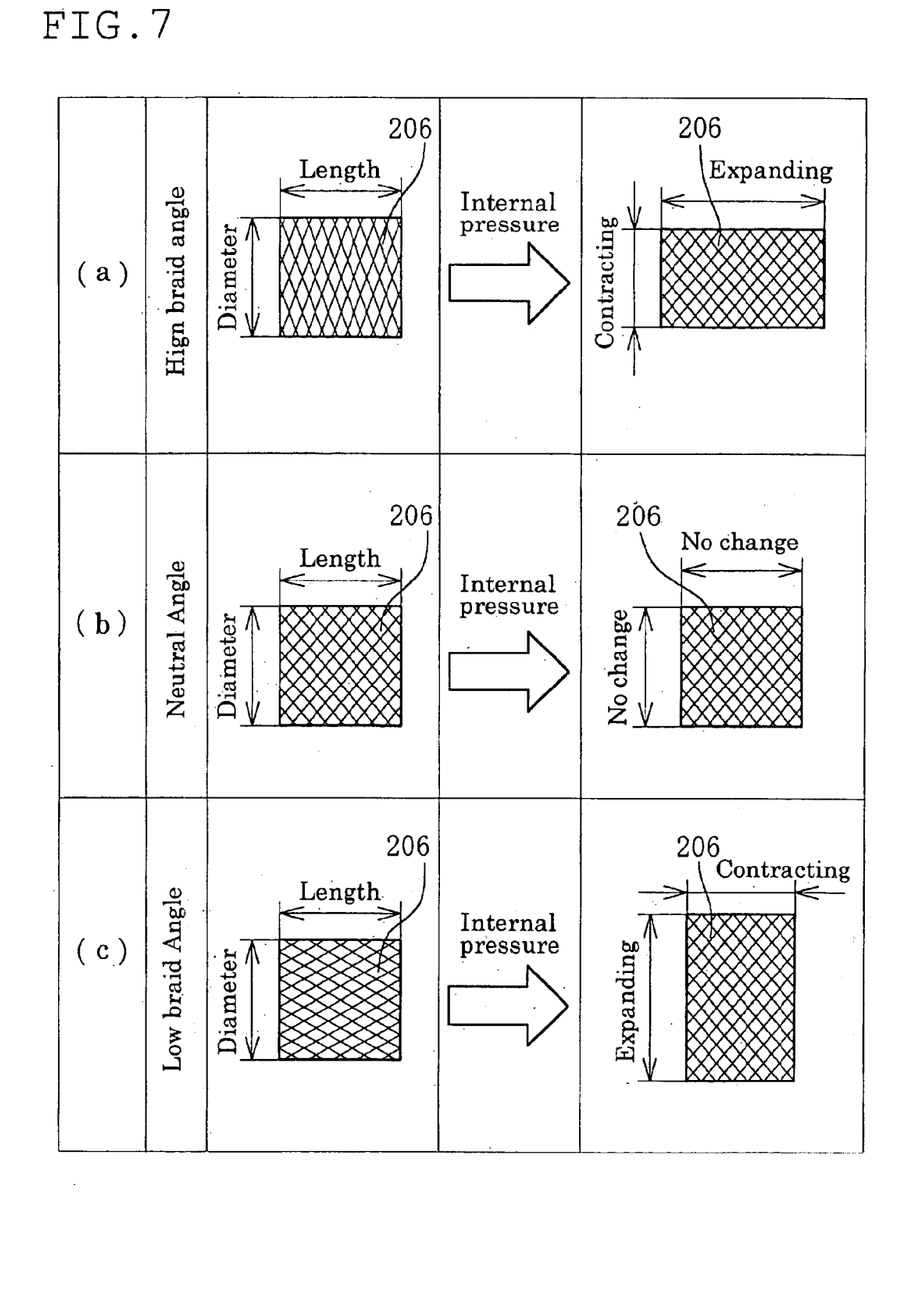
FIG. 7 is a view used to explain status of a reinforced layer of the hose with corrugated metal tube in FIG. 5 when the hose with corrugated metal tube is subject to internal pressure.

Braid angle of reinforcing filament member or members in the reinforced layer 206 has a following technical meaning. If braid angle of reinforcing filament member or members in the reinforced layer 206 with respect to an axial direction is higher or larger than a neutral angle, the hose including the reinforced layer 206 overall tends to expand or elongate longitudinally and contract in a radial or diametrical direction so as to make braid angle of reinforcing filament member or members close to or to be a neutral angle when an internal pressure is exerted thereto, as shown in FIG. 7 (a). Here and so forth, it is based on the hypothesis that reinforcing filament member itself or reinforcing filament members themselves do not elongated. And, in "braid angle", a winding angle is, also included.

On the contrary, as shown in FIG. 7(c), if braid angle of the reinforcing filament member or members in the reinforced layer 206 is lower or smaller than a neutral angle, the hose including reinforced layer 206 overall tends to contract in a longitudinal direction and expand in a radial direction so as to make braid angle thereof close to or to be a neutral angle when an internal pressure is exerted thereto. And, as shown in FIG. 7(b), if braid angle of reinforcing filament member or members in the reinforced layer 206 is initially a neutral angle, the reinforcing filament member or members tend to remain at the initial neutral angle when an internal pressure is exerted thereto. That is, the hose overall tends to remain as it is both in diameter and length.

Hence, it is estimated that as the reinforced layer 206 provides small resistance to axial elongation and deformation of the corrugated metal tube 202 in the portion behind the last swaged point $P_3$ if braid angle of the reinforcing filament member or members in the reinforced layer 206 becomes high in the portion therebehind as stated above by compressing or swaging the socket fitting 210 radially inwardly, the corrugated metal tube 202 more likely expands, elongates, contracts or axially deforms in the portion therebehind.

Then the inventors investigated a state of the hose with corrugated metal tube after repeat pressure test conducted thereto, and confirmed the reinforced layer 206 actually loosened, relaxed or surged at the portion behind the last swaged point $P_3$.

Figure 8:
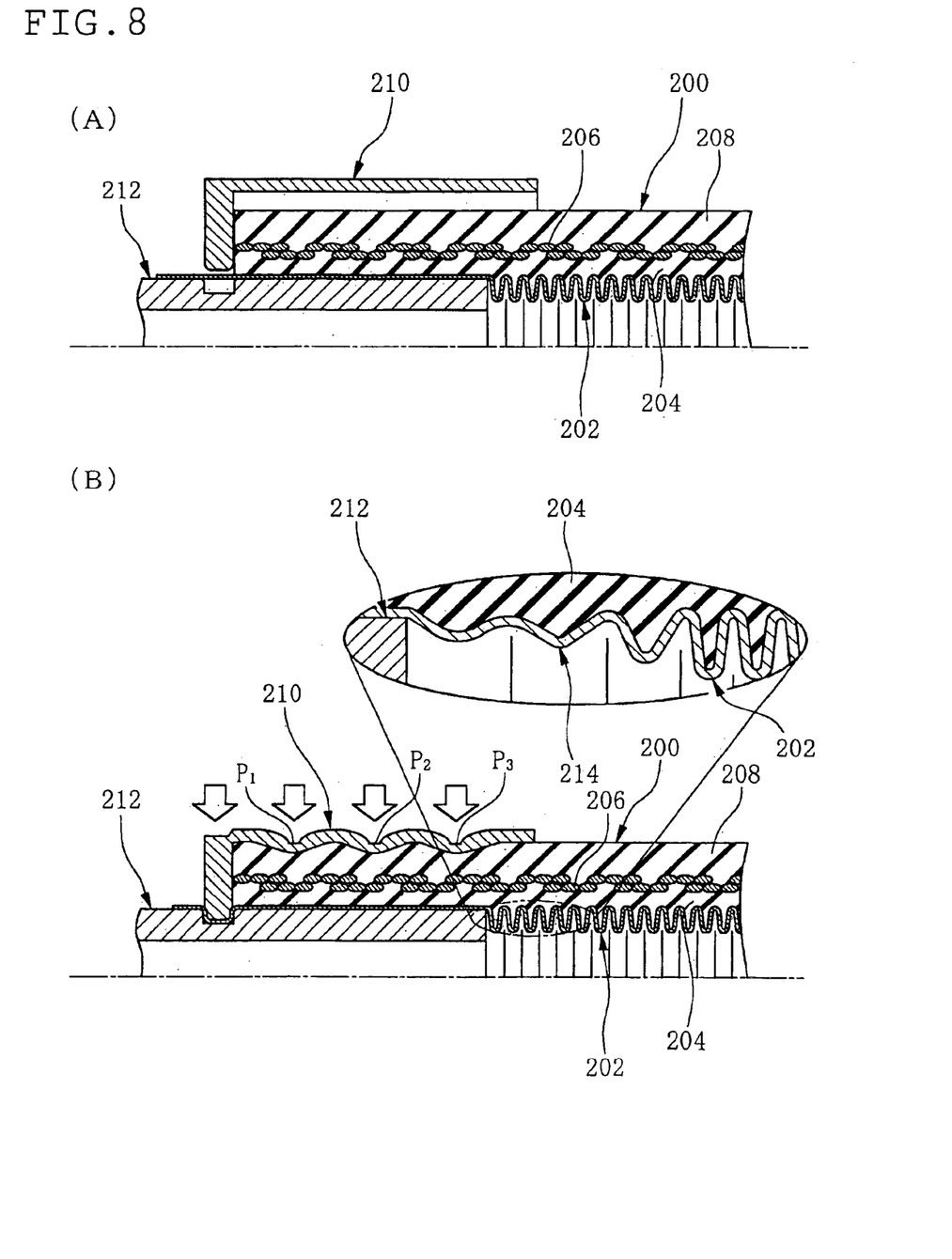
FIG. 8(A) is a cross-sectional view of a relevant portion of a hose with corrugated metal tube of a type in FIG. 5 before a socket fitting is swaged.
FIG. 8(B) is a cross-sectional view of a relevant portion of a hose with corrugated metal tube of a type in FIG. 5 after the socket fitting is swaged, including an enlarged view showing a defect caused thereon.

Further, as shown in FIG. 8, the inventors found at the same time that the corrugated metal tube 202 is flattened, elongated and deformed axially, thereby formed actually into incomplete flat corrugations 214 at a portion behind or rearwardly from the last swaged point $P_3$ under compressing or swaging pressure of the socket fitting 210, and the corrugated metal tube 202 is cracked or broken at a border region between the incomplete flat corrugations 214 and the complete corrugations, specifically at a distance corresponding to about two hills or two complete hills from the incomplete flat corrugations 214.

This phenomenon is estimated to be caused as follows. The incomplete flat corrugations 214, which was elongated and deformed axially and thereby was formed, provide high resistance against elongating and contracting deformation in an axial direction when internal pressure is exerted repeatedly. On the other hand, under repeated internal pressure, the complete corrugations likely elongates, contracts and deforms in an axial direction, further, as stated above the reinforced layer 206 provides low resistance against elongating deformation in an axial direction of the corrugated metal tube 202 at the position behind the last swaged point $P_3$, and thereby the corrugated metal tube 202 tends to elongate, contract and deform at the position therebehind. Accordingly a stress is likely concentrated around the border region between the incomplete flat corrugations 214 and the complete corrugations specifically. Those factors cooperate each other, and thereby the corrugated metal tube 202 is cracked or broken generally at a certain distance behind the last swaged point $P_3$.

And impulse tests or repeated pressurizing tests are conducted on various hoses with corrugated metal tube, and it is proved that in most of the hoses with corrugated metal tube, corrugated metal tubes are cracked or broken at corrugation hills generally of a certain distance behind the last swaged point or corrugation hills front or rear of a position of the certain distance behind the last swaged point, specifically about at 7.0 mm therebehind.

Here, the incomplete flat corrugations or the flat and incomplete corrugated portion mean corrugations in which a pitch between corrugation hills or between corrugation valleys is larger or height of corrugation is lower compared to typical corrugations or complete corrugations. For example, a pitch therebetween is 2.0 mm or longer in incomplete flat corrugations or flat and incomplete corrugated portion, while that is 1.5 mm in typical or complete corrugations. Or height of a corrugation (distance between a peak and a valley of a corrugation) is 1.0 mm or lower in the incomplete flat corrugations or the flat and incomplete corrugations, while that is 1.5 mm in the typical or complete corrugations.

According to the present invention based on that knowledge, a corrugated metal tube may be provided with a flattened end portion comprising an axially straight tubular or axially straight-walled portion on one axial end portion thereof, said flattened end portion having a proximal end positioned so as to extend for minimum 10 mm axially away in the direction of the complete corrugations from a last swaged point or a swaged point that is axially most proximate to the proximal end. That is, a longitudinal distance between the proximal end of the straight tubular portion and the last swaged point of the socket fitting is minimum 10 mm.

As a corrugated metal tube that is provided with a flattened end portion, such as a straight tubular portion, having a proximal end positioned so as to extend a distance of about 7.0 mm behind a last swaged point is likely cracked or broken, the corrugated metal tube is favorably prevented from fatigue crack or break caused by repeated internal pressures, and thereby service life of a hose having the corrugated metal tube may be effectively prolonged if the proximal end of the straight tubular portion is located or extends beyond a position about 7.0 mm behind the last swaged portion in the direction of the complete corrugations.

According to the present invention, instead of providing a flattened end portion by extending the straight tubular or straight-walled portion for a predetermined length from the last swaged point, a corrugated metal tube may be provided with a flattened end portion comprising a pre-formed flat and incomplete corrugated portion so as to extend for minimum 10 mm axially beyond a last swaged point. In this case, the corrugated metal tube is also favorably restrained from fatigue crack or break and thereby service life of a hose having the corrugated metal tube may be also prolonged.

It is confirmed that a corrugated metal tube specifically is likely cracked or broken at the above-stated portion or position when swaging rate is minimum 20% at the last swaged point. Therefore, the present invention proves more effective when swaging rate is minimum 20% at the last swaged point.

The swaging rate is given by the following formula.

Swaging rate=$(T_0-T_1)/T_0 \times 100 (\%)$ where $T_0$ is a thickness of a hose body before swaged, and $T_1$ is a thickness of a swaged point of the hose body after swaged.

Now, the preferred embodiments of the present invention will be described in detail with reference to the drawings.

DETAILED DESCRIPTIONS OF PREFERRED EMBODIMENTS

Figure 1:
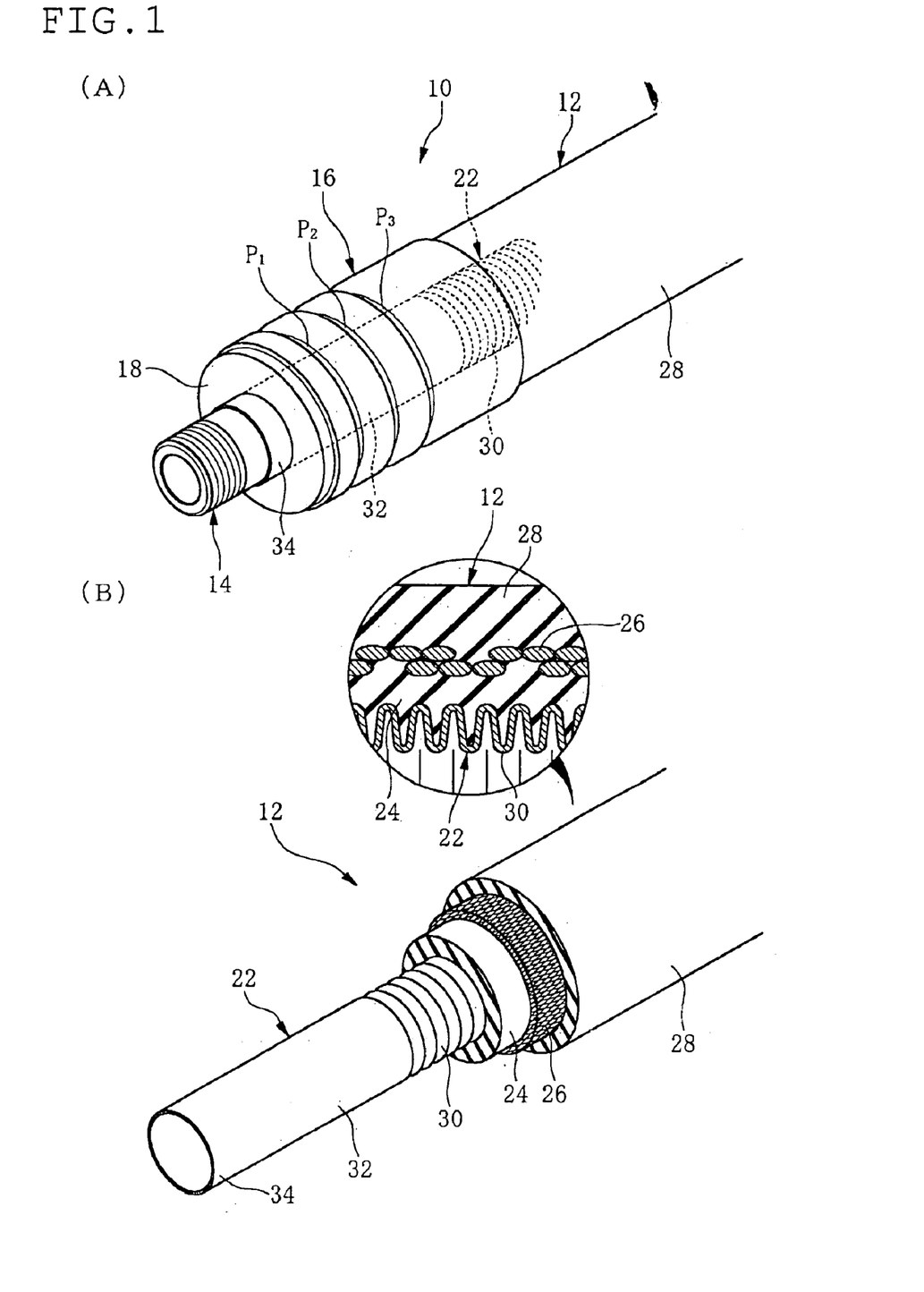
FIG. 1(A) is a perspective view of a hose with corrugated metal tube as one embodiment according to the present invention.
FIG. 1(B) is a perspective view showing construction of the hose with corrugated metal tube, including a cross-sectional view of a relevant part thereof.
Figure 2:
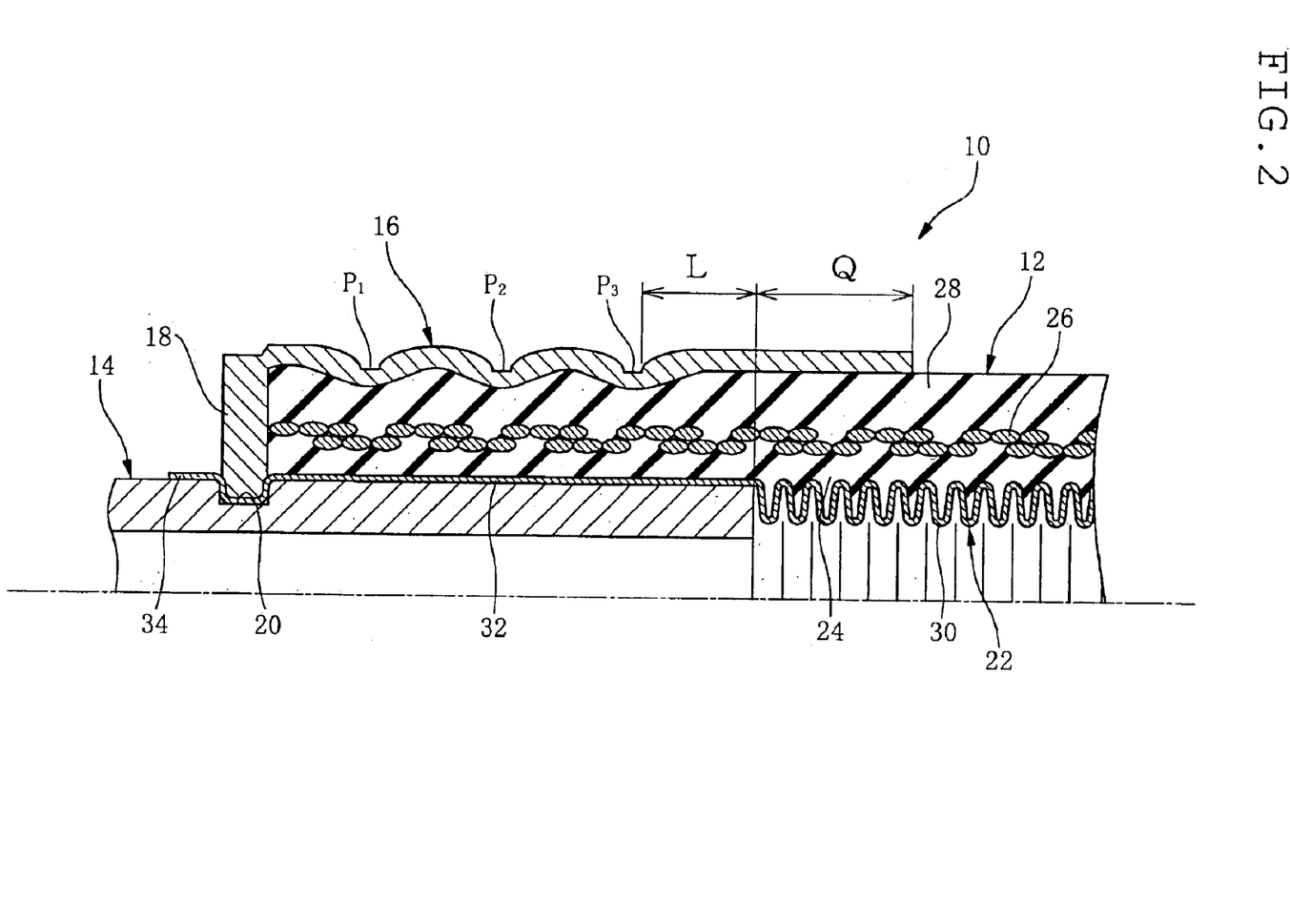
FIG. 2 is a cross-sectional view of a relevant portion of the hose with corrugated metal tube.

In FIGS. 1 and 2, a numeral reference 10 indicates a hose with corrugated metal tube (hereinafter referred to as a hose) which is preferably adapted for hydrogen or hydrogen gas conveying hose, refrigerant conveying hose for air conditioners, automobile fuel conveying hose or the like. A numeral reference 12 indicates a hose body, a numeral reference 14 a metal connecting pipe fixed to the hose body 12, and a numeral reference 16 a metallic socket fitting fitted onto or on an outer surface of the hose body 12 on one axial end portion thereof.

The socket fitting 16 is securely compressed or swaged radially inwardly to the hose body 12 and thereby the connecting pipe 14 is, along with the socket fitting 16, fixedly secured to one axial end portion of the hose body 12 so as to clamp one axial end portion thereof from a radial inside and a radial outside thereof.

As shown in FIG. 2, the socket fitting 16 is securely compressed or swaged radially inwardly to the hose body 12 on three axially spaced points thereof. In FIG. 2, $P_1$ indicates a first swaged point nearest one axial or longitudinal end of the hose body 12, $P_2$ a second swaged point and $P_3$ a third or last swaged point of most opposite axial or longitudinal side thereof.

The socket fitting 16 has a radially inwardly directed collar-like portion 18 on one axial end thereof, while the connecting pipe 14 is formed with a fit-engagement groove 20 at a position axially corresponding to the collar-like portion 18 on a radially outer surface thereof. The collar-like portion 18 or an inner end portion of the collar-like portion 18 is fitted in and engaged with the fit-engagement groove 20 by securely compressing or swaging the socket fitting 16 radially inwardly to the hose body 12.

As understood from FIG. 2, the hose body 12 has multi-layer construction which includes a corrugated metal tube 22 as an innermost layer. The multi-layer construction also includes an inner elastic layer 24, a reinforced (reinforcing) layer 26 and an outer elastic layer 28 which circumscribe an outer side of the corrugated metal tube 22. Each of the layers is fixedly bonded in unitary relation to an adjacent layer into a composite hose by vulcanizing or other manner.

In this embodiment, the inner elastic layer 24, the reinforced layer 26 of middle layer and the outer elastic layer 28 construct outer layer circumscribing the corrugated metal tube 22.

And, in this embodiment, the reinforced layer 26 is constructed by braiding or weaving reinforcing filament members at a pre-determined braid angle in opposed angled relation with one another or in opposed angled relation with respect to an axial or longitudinal direction. The reinforced layer 26 may be a fiber-reinforced layer or a wire-reinforced layer.

And the inner elastic layer 24 and the outer elastic layer 28 may be made of elastic material such as rubber.

On the other hand, the corrugated metal tube 22 as an innermost layer is formed with corrugations 30 for generally entire axial length thereof, which provides the corrugated metal tube 22 with flexibility.

That is, although, in this embodiment, an innermost layer of the hose 10 is a metal tube, the hose 10 is provided entirely with flexibility, thanks to the corrugations 30 formed on the metal tube.

The corrugated metal tube 22 may be made of materials such as steel products including stainless steel, copper, copper alloy, aluminum, aluminum alloy, nickel, nickel alloy, titanium or titanium alloy, and preferably may be made of stainless steel.

A wall thickness of the corrugated metal tube 22 may be from 20 to 500 μm, preferably is minimum 50 μm in view of preventing defects such as pinholes and further in view of processing of the corrugations 30 or the like, and maximum 300 μm in view of flexibility and durability.

The corrugated metal tube 22 has a flattened end portion comprising an axially straight-walled portion or axially straight tubular portion 32 extending straight in an axial direction on one axial end. The corrugated metal tube 22 or the straight tubular portion 32 is configured to include an extending portion 34 on a leading axial end, which extends outwardly in an axial direction and is exposed out of the outer layer comprising the inner elastic layer 24, the reinforced layer 26 and the outer elastic layer 28.

And, the extending portion 34 is clamped radially with an inner end portion of the collar-like portion 18 and the fit-engagement groove 20 of the connecting pipe 14 by securely compressing or swaging the socket fitting 16. The corrugated metal tube 22 is firmly fixed to the connecting pipe 14 at the fit-engagement groove 20, while an air tight seal is provided between the corrugated metal tube 22 and an outer surface of the connecting pipe 14.

Securing structure between an axial end portion or one axial end portion of the corrugated metal tube 22 and the connecting pipe 14 as stated is only one of embodiments. According to a shape of a connecting pipe 14 or other factors, securing structure and sealing structure may be constructed in various manners between an axial end portion of a corrugated metal tube and a connecting pipe, for example, of various shape.

In the embodiment shown in FIG. 2, the connecting pipe 14 and the straight tubular portion 32 of the corrugated metal tube 22 are arranged or formed respectively so as to extend for a distance L (L=15 mm in this embodiment) longitudinally toward the right-hand side in FIG. 2 beyond the third or last swaged point $P_3$ of the socket fitting 16, namely in a direction away from the free axial end of the hose body 12 or in the axial direction toward the complete corrugations 30. That is, the proximal end of the straight tubular portion 32 is located or extends for the distance L from the third or last swaged point $P_3$ toward the complete corrugations. And, in this embodiment, the socket fitting 16 or a cylindrical portion thereof is arranged or formed so as to extend further for a distance Q beyond the axial inner ends (right-hand ends in FIG. 2) of the connecting pipe 14 and the straight tubular portion 32.

In the hose 10 of this embodiment, the corrugated metal tube 22 is formed with the straight tubular portion 32 on one axial end portion thereof which is arranged so as to extend for a distance L beyond the third or last swaged point $P_3$. That means, the straight tubular portion 32 extends axially long beyond a position of about 7.0 mm behind the third swaged point. $P_3$ where the corrugated metal tube 22 is most likely cracked or broken, thereby the corrugated metal tube 22 may be favorably prevented from fatigue crack caused by repeated internal pressures, and service life of the hose 10 may be effectively prolonged.

By the way, Table 1 shows results of Impulse Test (repeatedly pressurizing test) conducted on the hose 10 or sample according to this embodiment and a comparative example hose with corrugated metal tube or comparative example. In Table 1, for example, as for the hose 10 of the embodiment, the row No. 1 where a number of cycle repetitions is 31,000 times and a cracking point is 17 mm means that the corrugated metal tube of the hose of the embodiment is cracked or broken at 17 mm behind the swaged point $P_3$ when pressure is repeatedly exerted thereto 31,000 times.

TABLE 1

Results of Impulse Test

| | Hose with Corrugated Metal Tube of the Embodiment | | Comparative Example Hose with Corrugated Metal Tube | |
|---|---|---|---|---|
| No. | Cycle Repetitions (10,000 times) | Cracking Point (mm) | Cycle Repetitions (10,000 times) | Cracking Point (mm) |
| 1 | 3.1 | 17.0 | 1.2 | 7.0 |
| 2 | 3.3 | 17.0 | 1.3 | 7.0 |
| 3 | 3.8 | 15.5 | 1.2 | 7.0 |
| 4 | 2.5 | 18.5 | 0.9 | 5.5 |
| 5 | 4.0 | 17.0 | 1.5 | 7.0 |
| 6 | 5.1 | 17.0 | 1.8 | 8.5 |
| 7 | 2.8 | 18.5 | 1.2 | 8.5 |
| 8 | 4.0 | 17.0 | 1.1 | 7.0 |
| 9 | 3.3 | 15.5 | 1.5 | 7.0 |
| 10 | 4.2 | 17.0 | 0.7 | 7.0 |

Figure 3:
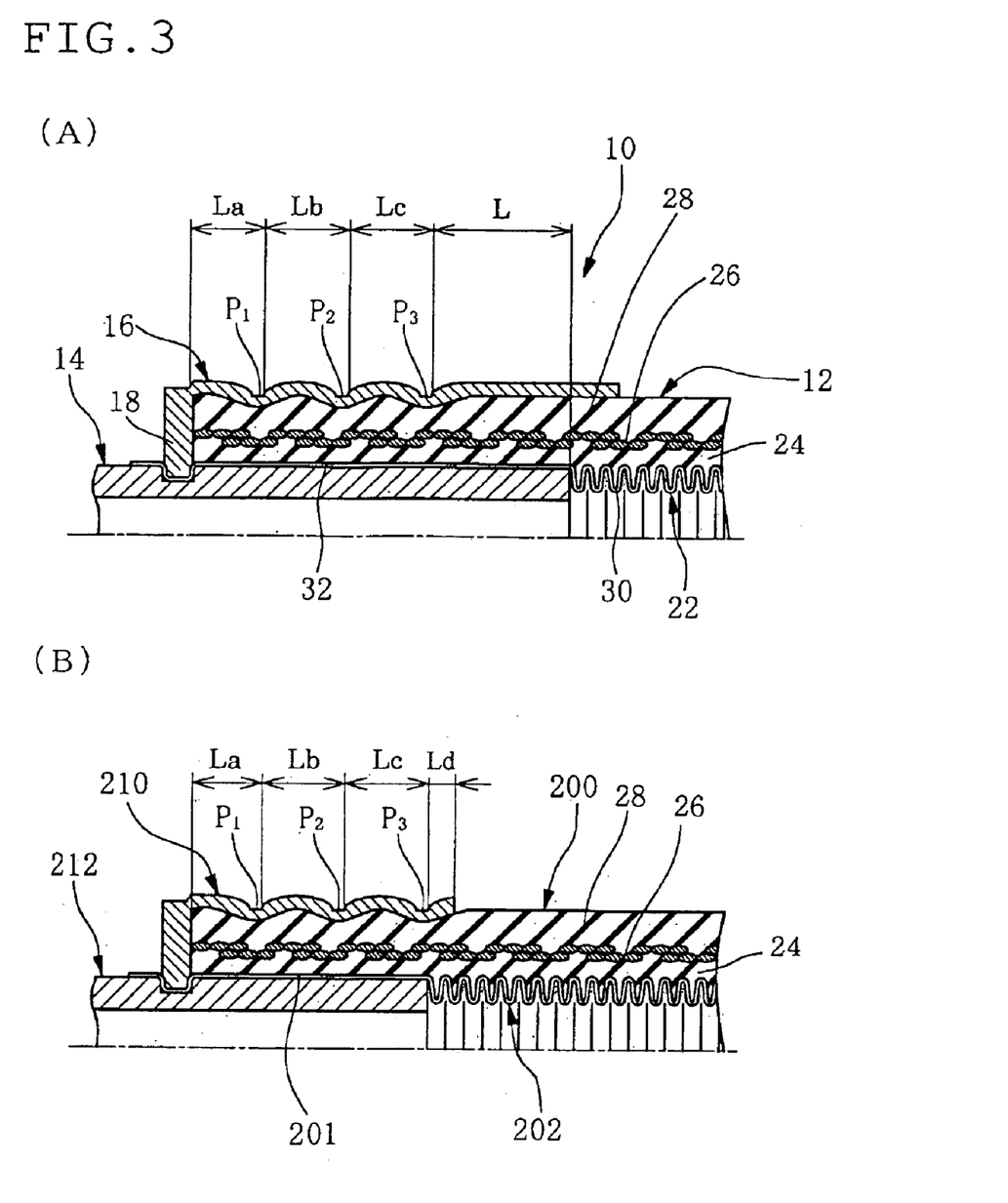
FIG. 3(A) is a cross-sectional view to explain concrete dimensions of the hose with corrugated metal tube.
FIG. 3(B) is a cross-sectional view of a relevant portion of a comparative example hose given for confirmation of effect in the above embodiment according to the present invention.

The hose of the embodiment or sample in Table 1 is shown in FIG. 3(A). In this hose 10, the first swaged point $P_1$ is arranged at a distance La (La=8.0 mm) from an inner surface of the collar-like portion 18, the second swaged point $P_2$ at a distance Lb (Lb=10 mm) from the first swaged point $P_1$, and the third swaged point $P_3$ at a distance Lc (Lc=10 mm) from the second swaged point $P_2$.

The straight tubular portion 32 and the connecting pipe 14 are arranged so as to extend for a distance L (L=15 mm) beyond the last or third swaged point $P_3$ in a right-hand direction in FIG. 3(A).

The corrugated metal tube 22 is made of stainless steel (SUS) in thickness of 0.15 mm. The inner elastic layer 24 is made of ethylene-propylene-diene-rubber (EPDM) in thickness of 0.5 mm, while the outer elastic layer 28 is made also of EPDM in thickness of 1.0 mm.

The reinforced layer 26 is constructing by braiding reinforcing filament member or members, or reinforcing threads, more specifically by braiding aramid type triple-yarns of 1,500 D (deniers) with yarn count of 24 at braid angle 55°.

The corrugation 30 of the corrugated metal tube 22 is formed of an inner diameter (full diameter) of 6.0 mm and an outer diameter (full diameter) of 9.0 mm.

On the first and the second swaged points $P_1$, $P_2$, the socket fitting 16 are swaged at swaging rate 30% respectively, while on the third swaged point $P_3$ the socket fitting 16 is swaged at swaging rate 20%.

The comparative example hose with corrugated metal tube or comparative example in Table 1, which is of a type shown in FIG. 5, is shown in FIG. 3(B). This comparative example hose has basically similar configuration to the hose 10 of FIG. 3(A). However, in the comparative example hose, opposite axial or longitudinal ends (right-hand ends in FIG. 3(B)) of the connecting pipe 212 and the straight tubular portion 201 of the corrugated metal tube 202 are arranged at a position axially corresponding to the last or third swaged point $P_3$.

And an opposite axial or longitudinal end (right-hand end in FIG. 3(B)) of the socket fitting 210 is located at a distance Ld (Ld=4.0 mm) from the third swaged point $P_3$ toward an opposite axial or longitudinal direction.

The impulse test is performed under conditions generally according to JASO M321 specified by Japanese Automobile Standards Organization (JASO).

However, test pressures 0<—>10 Mpa are applied in this test, although test pressures 0<—>3.53 Mpa are specified in JASO M321.

As seen from the results of Table 1, cracking points on the corrugated metal tubes 22, 202 differ between the hose 10 of the embodiment and the comparative example hose. And, thereby the hose 10 of the embodiment has longer duration life or service life.

As stated, the corrugated metal tube 22 of the hose 10 of the embodiment is broken at points different from those of the corrugated metal tube 202 of the comparative example hose, and the hose 10 of the embodiment has longer duration life than the comparative example hose. In the hose 10 of the embodiment, the straight tubular portion 32 on one axial end portion of the corrugated metal tube 22 extends long beyond possible breaking points in the comparative example hose, and there is no or little loosen or irregular portion in the reinforced layer 26 even under compressing or swaging pressure at an axial position adjacent to the straight tubular portion 32. It is estimated that these factors cooperate each other to realize long duration life of the hose 10.

Table 2 shows elongation of the hose body 12 of the hose 10 at 0 to 5 mm, 5 to 10 mm, 10 to 15 mm and beyond 15 mm from the swaged point $P_3$ under various swaged rates at the third swaged point $P_3$, when internal pressure 10 Mpa is exerted thereto.

In Table 2, "Main Part of the Hose" means a portion of the hose body 12 beyond 15 mm from the swaged portion $P_3$.

TABLE 2

|  |  |  | Swaging Rate (%) | | |
| --- | --- | --- | --- | --- | --- |
| Swaged Point |  | $P_1$ | 30 | 30 | 30 |
|  |  | $P_2$ | 30 | 30 | 30 |
|  |  | $P_3$ | 30 | 20 | 10 |
| Elongation | Distance | 0 to 5 mm | 0.8 | 0.6 | 0.4 |

TABLE 2-continued

|  |  |  | Swaging Rate (%) | | |
| --- | --- | --- | --- | --- | --- |
| under Pressure 10 Mpa (mm) | from the Swaged Point $P_3$ | 5 to 10 mm | 0.5 | 0.4 | 0.3 |
|  |  | 10 to 15 mm | 0.3 | 0.2 | 0.2 |
|  | Main Part of the Hose (beyond 15 mm) |  | 0.13 | 0.13 | 0.13 |

Table 2 shows that the hose body 12 of the hose 10 of this embodiment elongates largely or at high rate in the range of 10 mm from the third swaged point $P_3$ while elongates a little or at low rate beyond that range specifically in case that the swaging rate is 20% or higher at the third swaged point $P_3$. Elongation of the hose body 12 varies depending on swaging rate at the third swaged point $P_3$. When the swaging rate at the third swaged point $P_3$ is under 20%, elongation thereof becomes a little or at low rate, even in the distance from the swaged point $P_3$ of "5 to 10 mm".

In other words, the reinforced layer 26 tends to be loosen largely or at high rate in the range of 10 mm from the third swaged point $P_3$ specifically in case that the swaging rate is 20% or higher at the third swaged point $P_3$, and loosening degree varies depending on swaging rate.

The above is only one embodiment of the present invention. According to the present invention, a hose with corrugated metal tube may be constructed in variety of modes.

Figure 4:
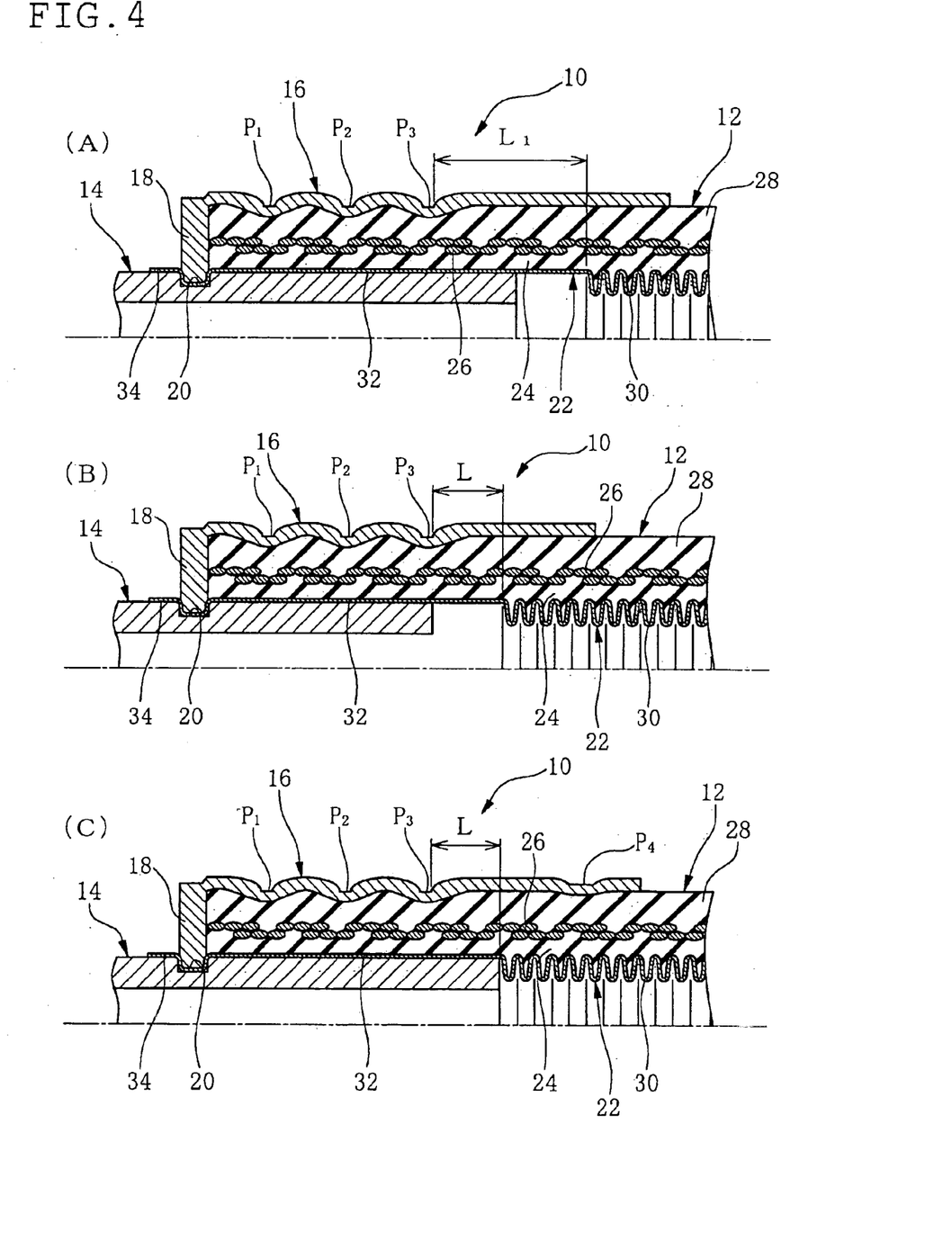
FIG. 4(A) is a cross-sectional view of a relevant portion of a hose with corrugated metal tube as another embodiment according to the present invention.
FIG. 4(B) is a cross-sectional view of a relevant portion of a hose with corrugated metal tube as yet another embodiment according to the present invention.
FIG. 4(C) is a cross-sectional view of a relevant portion of a hose with corrugated metal tube as further another embodiment according to the present invention.

FIG. 4(A) shows another embodiment of the present invention. In the another embodiment, a straight tubular portion 32 of a corrugated metal tube 22 is formed so as to extend further rearwardly (right-hand side in FIG. 4(A)) compared to that of the first embodiment shown in FIG. 2, namely so as to extend for a distance $L_1$ ($L_1$>L) behind or rearwardly from a third swaged point $P_3$.

FIG. 4(B) shows yet another embodiment of the present invention. In the yet another embodiment of the present invention, only a straight tubular portion 32 is formed so as to extend for a distance L behind or rearwardly from a third swaged point $P_3$, while a connecting pipe 14 is formed so that an opposite axial or longitudinal end (right-hand end in FIG. 4(B)) thereof extends to a position axially corresponding to the third swaged point $P_3$.

According to the present invention, a swaged point located most far away from one axial end of a hose body 12 or in most opposite axial side of points which are swaged at minimum 20% may be determined as last swaged point and a hose 10 may be constructed by forming a straight tubular portion 32 so as to extend for minimum 10 mm from this last swaged point.

FIG. 4(C) shows thus constructed hose 10 as further another embodiment.

In the further another embodiment, a socket fitting 16 is compressed or swaged radially inwardly to the hose body 12 also at a forth swaged point $P_4$ further behind or rearwardly from the third swaged point $P_3$ in a hose of a type of the first embodiment.

However, the swaging rate at the forth swaged point $P_4$ is under 20% while the swaging rate at swaged points $P_1$, $P_2$, $P_3$ is minimum 20% in the first to forth embodiments shown in FIGS. 1, 2, 4(A), 4(B) and 4(C). In the further another embodiment, the straight tubular portion 32 of the corrugated metal tube 22 extends for a distance L (L is minimum 10 mm) from the third swaged point $P_3$ and terminates ahead of the forth swaged point $P_4$ or on one axial or longitudinal side from the forth swaged point $P_4$.

In the above embodiments, the straight tubular portion 32 is formed so as to extend relatively long. However, instead, pre-formed flat and incomplete corrugations may be arranged so as to extend for minimum 10 mm beyond the third swaged point $P_3$. Here, an opposite longitudinal or axial end of the pre-formed flat and incomplete corrugations is located or extends for minimum 10 mm behind the third swaged point $P_3$. In this configuration, also the corrugated metal tube 22 may be favorably prevented from fatigue crack and duration, and service life of the hose 10 may be prolonged.

Although the present invention has been described in terms of preferred embodiments, it will be understood that a variety of modifications can be made without departing from the spirit and the scope of the invention.

We claim:

1. A hose with a corrugated metal tube, comprising:

a hose body having an inner layer including a corrugated metal tube and an outer layer including a reinforced layer and circumscribing a radial outer side of the inner layer, the corrugated metal tube being provided with a flattened end portion on one axial end portion thereof;

a socket fitting fitted on the hose body at an end portion thereof corresponding generally to said flattened end portion, and compressed or swaged radially inwardly to be secured thereto;

a proximal end of said flattened end portion extends axially away in the direction of the complete corrugations of said corrugated tube from a swaged point of the socket fitting that is axially most proximate to said proximal end; and an axial distance between the proximal end of the flattened end portion and the swaged point most proximate thereto being at a minimum 10 mm.

2. The hose with a corrugated metal tube as set forth in claim 1 wherein a swaging rate for the socket fitting at the most proximate swaged point is at a minimum 20%.

* * * * *